United States Patent
Braun et al.

(10) Patent No.: US 7,043,354 B2
(45) Date of Patent: May 9, 2006

(54) METHOD FOR AUTOMATICALLY STARTING AN INTERNAL COMBUSTION ENGINE

(75) Inventors: Harald Braun, Esslingen (DE); Torsten Scholt, Stuttgart (DE); Andreas Schondelmaier, Erdmannshausen (DE); Matthias Schorpp, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/009,970

(22) Filed: Dec. 13, 2004

(65) Prior Publication Data

US 2005/0131622 A1    Jun. 16, 2005

(30) Foreign Application Priority Data

Dec. 11, 2003    (DE) ............................. 103 57 933

(51) Int. Cl.
*F02D 17/00* (2006.01)
(52) U.S. Cl. ................... 701/113; 123/179.15
(58) Field of Classification Search ............... 701/112, 701/113; 123/179.15, 179.21; 180/279; 477/103
See application file for complete search history.

(56) References Cited

U.S. PATENT DOCUMENTS 6,347,608 B1 * 2/2002 Hara et al. ............... 123/179.4
6,754,579 B1 * 6/2004 Kamiya et al. ............ 701/112

FOREIGN PATENT DOCUMENTS

EP    10 63 424 B1    12/2002
JP    2004-124923 A *    4/2004

* cited by examiner

*Primary Examiner*—Hieu T. Vo
(74) *Attorney, Agent, or Firm*—Fitch, Even, Tabin & Flannery; Norman N. Kunitz

(57) ABSTRACT

A method and a device for automatically starting an internal combustion engine having a brake pressure monitoring system and an arrangement evaluating the brake pressure with respect to its profile over time. The brake pressure gradient is evaluated when the brake pedal is released before the vehicle is restarted. If the absolute value of the negative brake pressure gradient when the brakes are released exceeds a threshold value, this upward transgression of the threshold value causes an electronic control system in the motor vehicle to restart the internal combustion engine in conjunction with a start/stop function. The main advantage which is achieved in this way is that the brake pressure gradient precedes the point at which the brake pressure reaches its position of rest so that a vehicle driver can sense the restarting of the internal combustion engine to be more spontaneous than in the prior art. With the solution according to the invention for restarting the internal combustion engine a longer period of time is available than with previously known solutions.

10 Claims, 3 Drawing Sheets

METHOD FOR AUTOMATICALLY STARTING AN INTERNAL COMBUSTION ENGINE

CROSS REFERENCE TO RELATED APPLICATION

This application claims the priority of German Patent Application No. 103 57 933.8, filed on Dec. 11, 2003, the subject matter of which, in its entirety, is incorporated herein by reference.

FIELD OF THE INVENTION

The invention relates to a method and a device for restarting an internal combustion engine in a motor vehicle, in which the engine is to be temporarily switched off in specific driving operating states in order to save fuel and is to be automatically restarted when the driving mode is resumed, without the vehicle driver having to actuate the starter with his ignition key for this purpose.

BACKGROUND OF THE INVENTION

A device of the generic type and a method of the generic type for automatically starting an internal combustion engine are known from the European patent EP 10 63 424 B1. In this previously known device and the previously known method, the position of the brake pedal is sensed by means of suitable sensors. If the vehicle driver releases the brake pedal again as it leaves its actuator position, the internal combustion engine of the motor vehicle is automatically started if the brake pedal approaches its actuated home position. In comparison with other start/stop devices which are also previously known for internal combustion engines, this has the advantage that the vehicle driver senses the restarting of the internal combustion engine as significantly more spontaneous.

Taking the prior art described above as the starting point, the object of the invention is to specify a further improved solution with which the vehicle driver senses the start/stop device as even more pleasant and the acceptance of the start/stop device according to the invention is increased.

SUMMARY OF THE INVENTION

The solution is arrived at by means of a method and a device corresponding to the independent claims. Advantageous refinements of the invention are disclosed in the subclaims and in the exemplary embodiments.

The solution is obtained mainly with a brake pressure monitoring system and a means of evaluating the brake pressure with respect to its profile over time. The brake pressure gradient is evaluated when the brake pedal is released before the vehicle is restarted. If the absolute value of the negative brake pressure gradient when the brakes are released exceeds a threshold value, this upward transgression of the threshold value causes an electronic control system in the motor vehicle to restart the internal combustion engine in conjunction with a start/stop function. The advantage which is mainly achieved with this is that the brake pressure gradient precedes the point at which the brake pedal reaches its position of rest so that a vehicle driver can sense the restarting of the internal combustion engine to be much more spontaneous than in the prior art. With the solution according to the invention for restarting the internal combustion engine, a longer time period is available than with the start/stop function such as is known from the European patent EP 10 63 424 B1. As a result, in contrast to the previously known prior art it becomes to possible to initiate the restarting of the internal combustion engine at such an early time that when the vehicle driver wishes to drive off again the engine is already completely started again. With the start/stop function from the prior art, only the time period which the vehicle driver requires changes from the brake pedal to the accelerator pedal is available for restarting the internal combustion engine. This time period is generally too short, giving rise to a situation in which it is necessary to take measures to ensure that the vehicle cannot start moving before the internal combustion engine has started. This has previously led to considerable acceptance problems of start/stop functions in motor vehicles.

A further advantage of the invention is the possibility of carrying out the restarting of the internal combustion engine in a way which is adapted to the respective vehicle driver. For this purpose, it is possible to include, for example, the driver type classification in the detection as to whether the brake pressure gradient has exceeded a predefined threshold value, said classification having been introduced in the modern motor vehicle for example from adaptive automatic transmissions. The adaptation to the respective vehicle driver is however also already supported by the brake pressure gradient itself since the brake pressure gradient is dependent on how quickly the vehicle driver releases the brake pedal. This also has the advantage that the restarting of the internal combustion engine can be adapted in a way which is appropriate to the situation. If the vehicle driver releases the brake pedal quickly, the internal combustion engine starts earlier, while if the vehicle driver relieves the brake pedal only slowly, the brake pressure gradient tends to remain low so that the internal combustion engine only needs to started again when the brake pressure itself drops below a threshold value.

In another advantageous exemplary embodiment, the vehicle driver can select whether or not he wishes to make use of the automatic start/stop function. For this purpose, he has the possibility of switching the function for automatically starting the internal combustion engine on and off by means of a switching means.

In another advantageous exemplary embodiment, additional sensors can also be included in the restarting detection operation, these sensors preventing the restarting of the internal combustion engine being carried out. This may be necessary, for example, for safety reasons if the engine hood of the motor vehicle is opened, the vehicle is involved in an accident or if the residual charge of the starter battery is no longer sufficient to be able to restart the internal combustion engine for a further number of times.

BRIEF DESCRIPTION OF THE DRAWINGS

Without restricting the general applicability, exemplary embodiments of the invention are explained in more detail below with reference to figures, of which.

DETAILED DESCRIPTION OF THE INVENTION

Figure 1:
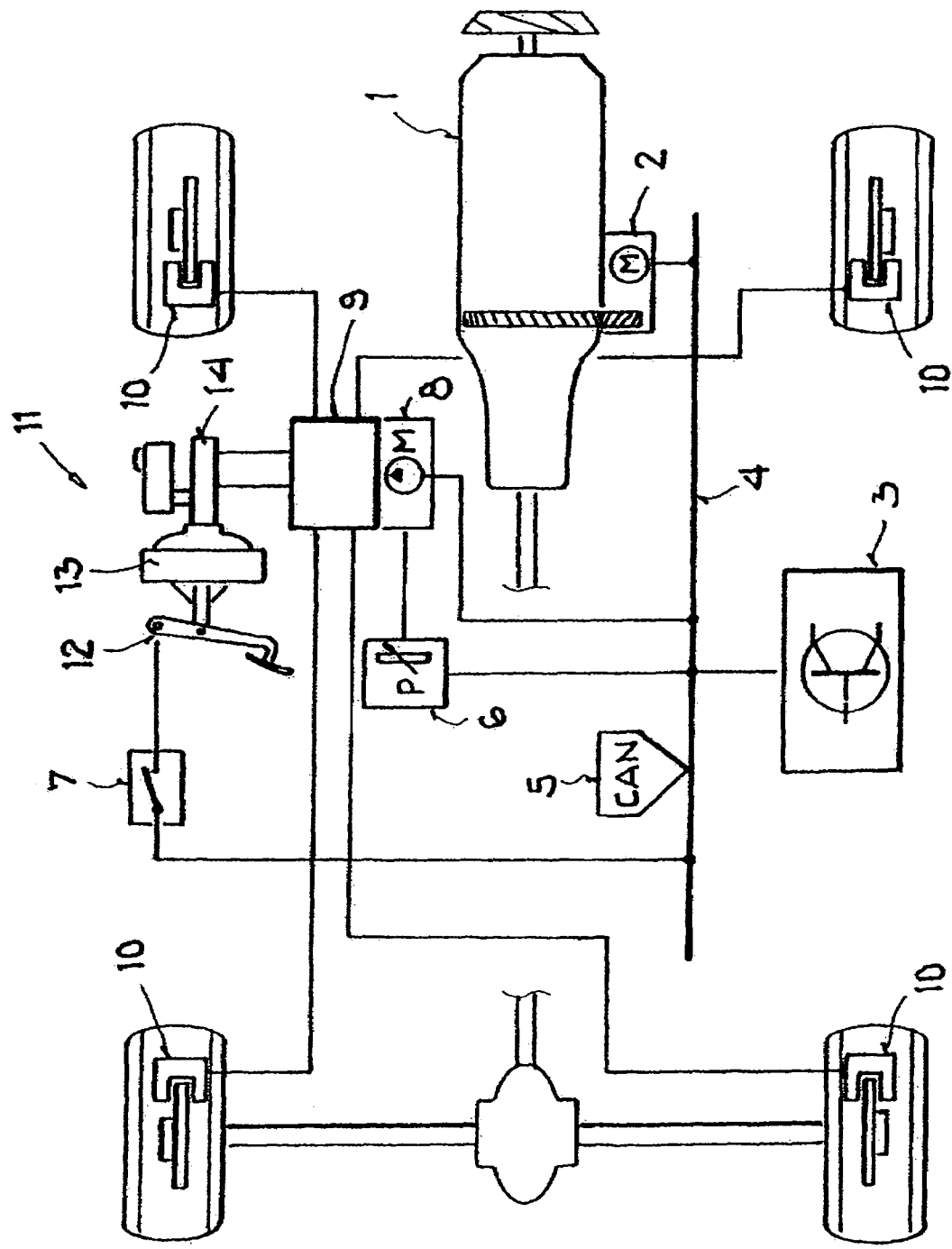
FIG. 1 is an overview diagram of the interaction between various components for a start/stop function in a motor vehicle.

The manner of operation of a method for automatically starting an internal combustion engine is explained in more detail below with reference to FIG. 1. An internal combustion engine 1 is started in a manner known per se with an electric starter 2. Alternative starting possibilities/starters are: starter generators integrated onto the crankshaft (ISG) or by means of the belt drive (RSG) and electric machines in hybrid vehicles, for example an electric machine which is connected to the crankshaft. The starting sequence for the electric starter 2 is transmitted by a control device 3 via a communication connection 4. A CAN bus system for communicating between various electrical and electronic units in the motor vehicle is preferably used in the motor vehicle. Further units which are important for the invention are connected to the CAN bus 5. As a result, the control device 3 is connected to a brake pressure sensor 6, to the master brake switch 7, to the starter 2 and to the hydraulic pump 8 of a hydraulic assembly 9. The hydraulic pump 8 and hydraulic assembly 9 supply and distribute the brake pressure to the wheel brakes 10 of the motor vehicle. The pressure which is to be used to activate the wheel brakes is predefined with a brake pressure regulator 11, usually comprising the brake pedal 12, a brake pressure booster 13 and a tandem master brake cylinder 14. The brake pressure is predefined here by a vehicle driver by actuating the brake pedal 12. The master brake switch 7 monitors and detects whether the brake pedal 12 has been actuated. If the brake pedal 12 has been actuated, the master brake switch 7 transmits a corresponding CAN signal to the control device 3. Corresponding to the predefined value for the brake pressure, the brake pressure is set at the wheel brakes by means of the control device 3 by actuating the hydraulic pump 8. For this purpose, a permanent brake pressure monitoring means and a corresponding brake pressure control means are implemented in the control device 3. The monitoring of the brake pressure is carried out here by means of the brake pressure sensor 6 which taps the brake pressure in the hydraulic lines of the brake system at a suitable point.

To this extent, as described above, the invention has recourse to motor vehicle systems which are known per se. The invention then consists in determining a brake pressure gradient from the brake pressure monitoring means. This chronological brake pressure gradient is compared, in terms of its absolute value, with a threshold value, and a decision criterion as to when a starting sequence in the form of a start bit is to be transmitted to the starter 2 of the internal combustion engine by the control device 3 is acquired from it so that the internal combustion engine is automatically started in this way. In practical terms, this means that the system monitors how quickly a vehicle driver takes his foot off the brake pedal 12. If the vehicle driver takes his foot off sufficiently quickly from the brake pedal 12, the brake pressure will be reduced with a correspondingly large brake pressure gradient. By predefining a threshold value with which the brake pressure gradient is compared, a suitable criterion can be established as to when the internal combustion engine is to be started. Since the brake pressure gradient precedes the point at which the brake pedal reaches the non-actuated position of rest, in comparison with conventional methods more time is gained for automatically starting the internal combustion engine. The necessary evaluation algorithms are implemented here as application programs in the electronic control device 3.

Figure 2:
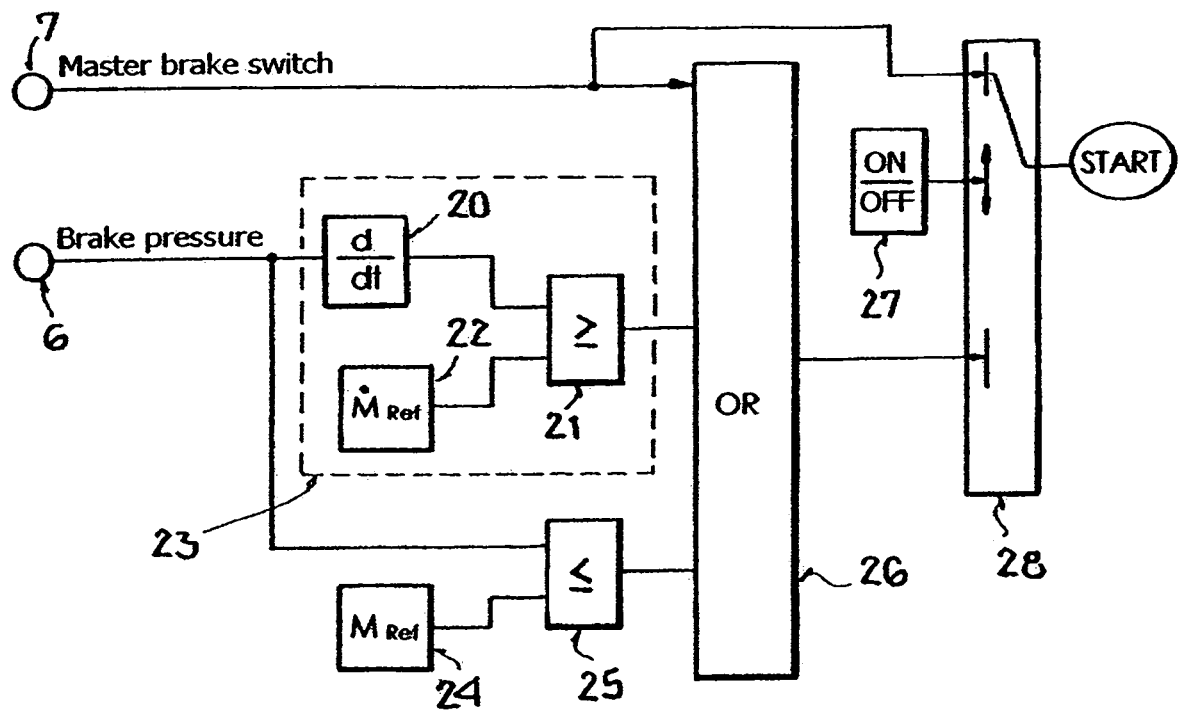
FIG. 2 shows a functional framework for the determining of the brake pressure gradient.

A functional diagram of the application program referred to above is shown in FIG. 2. The brake pressure signal which is transmitted by the pressure sensor 6 to the control device 3 is subjected to a derivation 20 over time by means of a data processing system and the brake pressure gradient which results from this is checked in terms of its sign and its absolute value. If the brake pressure gradient is negative, that is to say if the brake pressure decreases, the absolute value of this decrease is fed to a comparison operation 21 in which a comparison is carried to determine whether or not the absolute value of the decrease in the brake pressure exceeds a predefined threshold value 22. If the absolute value of the brake pressure gradient exceeds the predefined threshold value, a starting signal is generated from the gradient evaluation 23 and passed on. The starting signal is preferably fed, in the form of a starter bit, to the CAN bus of the communications network in the vehicle. In the exemplary embodiment in FIG. 2, OR operations are performed on the starting signal from the gradient evaluation 23 with respect to further redundant possible starting conditions. Further conditions for the generation of a starting signal are that the brake pressure itself drops to below a reference value 24. For this purpose, the brake pressure is compared using a comparison operation 25 with the threshold value for the brake pressure. If the brake pressure drops below the predefined threshold value, a starting signal is also generated. A third possible way of automatically generating a starting signal is to use the signal of the master brake switch 7. If the brake pedal reaches its non-actuated position of rest, this is detected by means of the master brake switch 7 and a starting signal is triggered in the control device 3. The three possible conditions for the triggering of a starting signal by means of the master brake switch 7, by means of the gradient evaluation 23 and by means of the brake pressure comparison 25 are subjected to an OR operation 26 with one another so that basically a starting signal can be fed to the CAN bus if at least one of the three previously mentioned conditions is fulfilled.

The result from the signal comparison of the OR operation 26, the automatic starting of the internal combustion engine by means of brake pressure monitoring and gradient evaluation, can also be switched off by the vehicle driver. By activating the switching element 27, which is provided as an operator control element in the passenger compartment of the vehicle, the vehicle driver can decide whether or not he wishes to make use of the brake pressure monitoring. Depending on the position of the switching element 27, the brake pressure monitoring is used for the automatic starting of the combustion engine, or not. If the brake pressure monitoring is switched off, it is nevertheless possible for automatic starting of the internal combustion engine to take place, the signal of the master brake switch merely being evaluated in the manner known per se. The internal combustion engine starts when the brake pedal moves back out of its actuated position into its non-actuated position of rest. The switching on and off of the brake pressure monitoring for the generation of a starting signal is preferably implemented by software using a logic switching means 28. The logic switching means 28 is composed here of a logic program interrogation, which signal is ultimately to be used for starting the internal combustion engine of the function of the position of the on/off switch 27. Depending on the position of the switch 27, either only the signal from the master brake cylinder is to be used or the signal from the OR operation 26, which contains the brake pressure monitoring, is to be used for starting the internal combustion engine.

Figure 3:
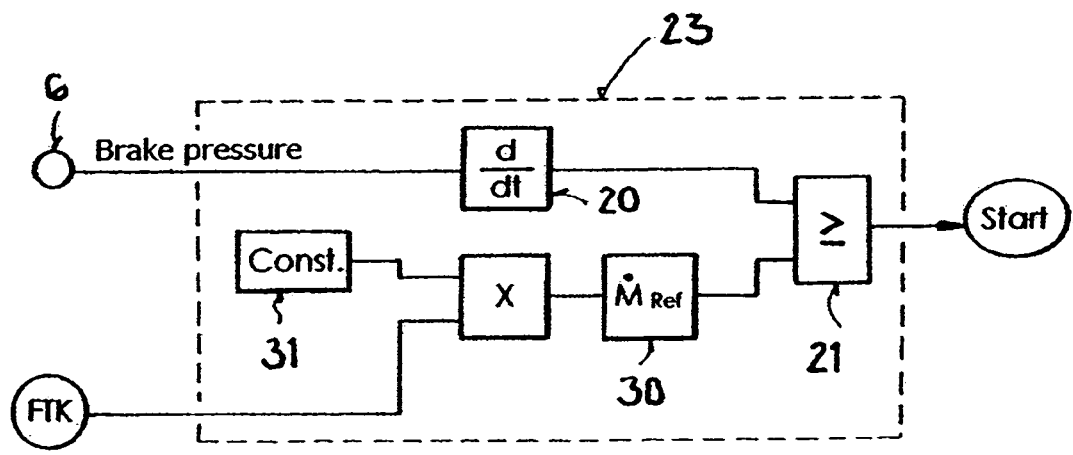
FIG. 3 shows a functional framework with vehicle type classification means.

The gradient evaluation 23 which has already been described in conjunction with FIG. 2 can also be carried out in an adaptive way. An example for a gradient evaluation 23 which is carried out in an adaptive way is restricted in the function diagram in FIG. 3. The evaluation of the brake pressure or of the brake pressure signal from the pressure sensor 6 is carried out in a way analogous to that in FIG. 2. A brake pressure gradient is formed and the brake pressure gradient is evaluated in terms of sign and absolute value. In the case of a negative sign, the absolute value of the brake pressure gradient is fed to a comparison operation 21 in which this absolute value is compared with a reference value. However, in contrast to the exemplary embodiment in FIG. 2, this reference value 30 can now be influenced and changed by means of the driver type classification. Driver type classifications are known from adaptive automatic transmissions or from control systems for adaptive automatic transmissions. They classify the driver in terms of his sporty inclinations with a value of, for example, 0 to 255. These driver type classifications which are known per se are then also used in the invention in order to generate a starting signal from the gradient evaluation 23. The reference value with which the absolute value of the brake pressure gradient is compared is formed here from the multiple of a basic constant 31, this basic constant 31 being multiplied by the numerical value of the driver type classification and this product forming the reference value 30 which is included in the comparison operation 21. If the absolute value of the brake pressure gradient exceeds the reference value which is obtained in this way, a starting signal is generated from the gradient evaluation 23. Sporty drivers will generally take their foot off the brake pedal more quickly so that with such drivers the absolute values of the brake pressure gradient are larger than for less sporty drivers. A larger reference value is therefore recommended for sporty drivers. Since otherwise misinterpretations as a result of the gradient evaluation may occur from the point of view of a sporty driver.

Figure 4:
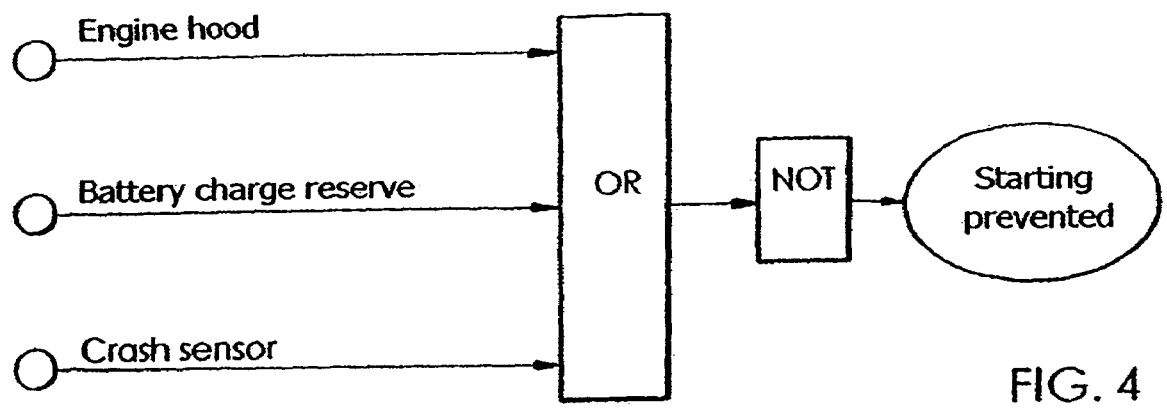
FIG. 4 shows a functional framework for preventing starting.

FIG. 4 refers to a safety aspect. Under certain selected conditions, the internal combustion engine should be prevented from starting by means of an automatic method. Particularly selected methods in which it is necessary to prevent the internal combustion engines starting automatically are an opened engine hood, an accident in which the vehicle is involved, or if the residual charge in the starter battery is no longer sufficient to start the internal combustion engine a number of times. In these cases, a starter bit which is possibly present and which has been generated from one of the preceding processes is negated and an automatic starting process is thus prevented.

The presence of an accident is generally detected using a crash sensor. The opened engine hood can also be detected with a suitable sensor and the monitoring of the starter battery with respect to a battery charge limit can also be carried out with a charge reserve monitoring system which is known per se.

Figure 5:
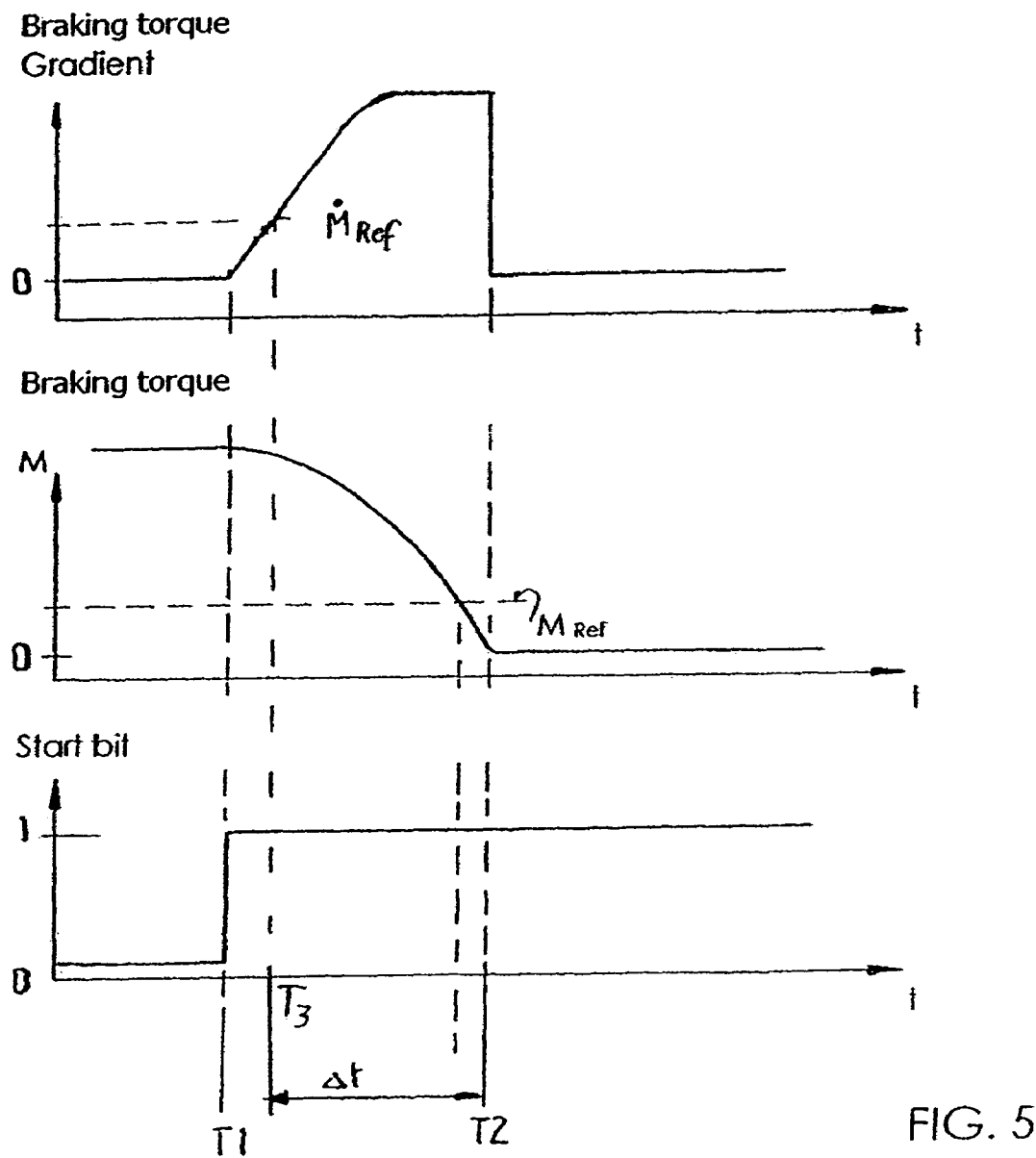
FIG. 5 shows the profile with respect to time of the brake pressure and brake pressure gradient.

FIG. 5 is also concerned with the method of operation of the invention. Three time diagrams which are referred to a common time base are illustrated. The profile of the brake pressure gradient, the profile over time of the brake pressure itself and the transmission of the starter bit to the communication bus of the vehicle are illustrated. At the time T1, the vehicle driver releases the brake pedal. Starting from the time T1, the braking torque at the wheel brakes will decrease and ultimately disappear entirely. The brake pressure and thus the braking torque has been reduced to zero at the time T2. In the method for automatically starting an internal combustion engine such as is known from the prior art, the starting of the internal combustion engine would be initiated at the time T2. However, the gradient evaluation of the brake pressure permits the internal combustion engine to be started significantly earlier. A brake pressure gradient which can be evaluated is in fact already present at the time T1 when the driver begins to take his foot off the brake pedal. A threshold value evaluation of the brake pressure gradient can thus be used to start an internal combustion engine. As a result, the internal combustion engine can be started by evaluating the brake pressure gradient signal very close to the time T1 at which the vehicle driver wishes to release the brake. In contrast with the prior art, the invention thus provides a time interval ?t between the times T3 in which interval the brake pressure gradient exceeds a predefined threshold value d/dt-$M_{ref}$ up to the time when the brake pressure drops to the value zero at the time T2, and said interval can additionally be used for automatic starting of the internal combustion engine. The method according to the invention has therefore provided a time advantage in comparison with the methods known from the prior art.

It will be appreciated that the above description of the present invention is susceptible to various modifications, changes and adaptations, and the same are intended to be comprehended within the meaning and range of equivalents of the appended claims.

What is claimed is:

1. A device for automatically starting an internal combustion engine, in particular in a motor vehicle, having a control device, an electric starter, a hydraulic brake system and a brake pressure sensor, the control device having a communication connection to the starter and to the brake pressure sensor, wherein the control device contains a starting algorithm and a brake pressure monitoring system in the form of a program which can be executed, and the brake pressure monitoring system determines the absolute value of a brake pressure gradient which decreases over time from the signals of the brake pressure sensor and compares it with a threshold value, and wherein a start bit is transmitted to the electric starter using the starting algorithm when the absolute value of the decreasing brake pressure gradient exceeds the threshold value.

2. The device as claimed in claim 1, wherein the control device is connected to a driver type classification which causes the threshold value to be adapted to the respective vehicle driver.

3. The device as claimed in claim 1, wherein the start bit is transmitted to the starter of the internal combustion engine if at least one of the following conditions is fulfilled:
the absolute value of the brake pressure gradient over time exceeds a threshold value when the brakes are released,
the brake pressure drops below a threshold value when the brakes are released,
the master brake switch is actuated and the brake lights are switched off.

4. The device as claimed in claim 3, including a switch connected to permit the brake pressure monitoring system to be optionally switched on and off by the vehicle driver.

5. The device as claimed in claim 1, wherein the control sensor is connected to sensors for the condition of the hood, for the residual charge of the starter battery, and for a crash, and the automatic starting of the internal combustion engine is prevented if at least one of the following conditions is fulfilled:

the engine hood of the motor vehicle is opened, the residual charge of the starter battery drops below a battery charge reserve, the crash sensor in the vehicle has signalled an accident.

6. A method for automatically starting an internal combustion engine in a motor vehicle, wherein the internal combustion engine is temporarily switched off in specific driving operating states, in particular in the stationary operating state, in order to save fuel, said method comprising starting the internal combustion engine again by actuating the brake pedal when the driving operating state changes including, monitoring the hydraulic brake pressure using a pressure sensor and evaluating the monitored brake pressure by a control device, and transmitting a start bit to the starter of the internal combustion engine if the absolute value of the brake pressure gradient over time exceeds a threshold value when the brakes are released.

7. The method as claimed in claim 1, including adapting the threshold value to the respective vehicle driver by use of a determined driver type classification.

8. The method as claimed in claim 1, wherein said step of transmitting includes transmitting the start bit to the starter of the internal combustion engine when at least one of the following conditions is fulfilled:

the absolute value of the brake pressure gradient over time exceeds a threshold value when the brakes are released, the brake pressure drops below a threshold value when the brakes are released, the master brake switch is actuated and the brake lights are switched off.

9. The method as claimed in claim 8, further including permitting the brake pressure monitoring system to be optionally switched on and off by the vehicle driver.

10. The method as claimed in claim 1, further including preventing the automatic starting of the internal combustion engine if at least one of the following conditions is fulfilled:

the engine hood of the motor vehicle is opened, the residual charge of the starter battery drops below a battery charge reserve, a crash sensor in the vehicle has signalled an accident.

* * * * *